(12) United States Patent
Friggstad

(10) Patent No.: US 6,186,244 B1
(45) Date of Patent: Feb. 13, 2001

(54) ADJUSTABLE CULTIVATOR HITCH FOR TOWING AN AIR CART

(75) Inventor: Terrance A. Friggstad, Grasswood SK (CA)

(73) Assignee: Flexi-Coil Ltd., Saskatoon (CA)

( * ) Notice: Under 35 U.S.C. 154(b), the term of this patent shall be extended for 0 days.

(21) Appl. No.: 09/430,639

(22) Filed: Oct. 29, 1999

Related U.S. Application Data

(60) Provisional application No. 60/108,076, filed on Nov. 12, 1998.

(51) Int. Cl.⁷ ....................................................... A01B 59/04
(52) U.S. Cl. ............................................................. 172/677
(58) Field of Search ................................... 172/439, 452, 172/605, 677, 679, 680, 776

(56) References Cited

U.S. PATENT DOCUMENTS

| | | | |
|---|---|---|---|
| 3,846,923 | * 11/1974 | Whittier | 172/605 X |
| 5,197,552 | * 3/1993 | Di Maria | 172/439 X |
| 5,971,082 | * 10/1999 | Satzler | 172/439 |
| 5,975,216 | * 11/1999 | Gibbons | 172/439 |
| 6,089,328 | * 7/2000 | Moore et al. | 172/439 X |

* cited by examiner

Primary Examiner—Christopher J. Novosad
(74) Attorney, Agent, or Firm—J. William Stader; Larry W. Miller

(57) ABSTRACT

The invention discloses an adjustable hitch for towing an air cart behind a cultivator or similar tillage device. The invention consists of a pivotable hitch which is connected to a pair of cultivator pivot arms pivotally mounted on the cultivator frame. The pivot arms are controlled by a pair of hydraulic cylinders. At the air cart end, the hitch has a pair of slides which are inserted into a pair of slots located on an offset air cart hitch. When the hydraulic cylinders move the cultivator pivot arms, the hitch pivots and allows the slides to move within the slots of the offset air cart hitch. The invention also has a pair of spring-biased, hydraulically actuated latches for securing the hitch in either the field or transport mode.

28 Claims, 14 Drawing Sheets

ADJUSTABLE CULTIVATOR HITCH FOR TOWING AN AIR CART

CROSS-REFERENCE TO RELATED APPLICATIONS

This application claims domestic priority on U.S. Provisional Patent Application Ser. No. 60/108,076, filed on Nov. 12, 1998.

BACKGROUND OF THE INVENTION

1. Field of Art

This invention relates to the improvement of an agricultural ground-working cultivator. More specifically it relates to an improvement of the cultivator hitch for towing an air cart.

2. Description of Prior Art

The need to till and cultivate soil for the planting of crops has been accomplished since the earliest days of civilization. More recently, tillage devices have increased in complexity and size, depending on the type of crops, quantity and soil being tilled. There has also been an increased emphasis on conserving natural resources resulting in these concerns being integrated in modern tillage systems. These concerns have resulted in larger and more complex tillage systems that assist in achieving these goals. A larger tillage system allows a single operator to perform tillage operations on a greater area. More sophisticated tillage systems further allow for the accomplishment of low till and no till farming techniques. Low till and no till farming encourages tilling, planting and fertilizing in a single pass of the tillage device or cultivator through the field. By only disturbing the soil a single time, there is less soil compaction, less moisture loss, less pesticides and herbicides needed and less fertilizer required. However, these larger and more complex tillage systems create complexities that were previously unknown in the art.

Previously, an agricultural tractor could pull a relatively small tillage device or cultivator. Later, a planter or similar seeding apparatus could pass over the field. However, it is now possible to make a single pass over the field. This allows both tilling and planting to be accomplished in one pass. To assist this goal, a tractor will pull a cultivator. The cultivator then pulls an air cart that can carry seeds, fertilizer or herbicide. FIGS. 1 and 2 illustrate a typical design configuration. As specifically seen in FIG. 2, there is a tractor 3 towing a large cultivator 1 or tillage device. Attached to the cultivator by a hitch is the air cart 2. The cultivator is supported by a series of castor wheels 5 located generally towards the front of the cultivator 2 and packing wheels 6, at the rear of the cultivator 1. Between the castor wheels 5 and packing wheels 6 are the tool bars 7. The tool bars 7 have various ground-working implements (not shown) attached. Usually, the ground-working tools open the soil, plants the seed and places fertilizer. The packing wheels then closes the soil. It is important that the packers track properly behind the ground working tools so that the packing is properly achieved on the row and not skewed to either side. The addition of a towed air cart 2 creates certain problems. As illustrated in FIG. 1, as the tractor (not shown) and cultivator 1 frequently move over a hills, the air cart 1 has a tendency to slide or pull the cultivator 1 to the left or right. This problem creates several undesirable effects. First, it creates 'stripping'. Stripping is the resulting un-tilled ground caused when the shank pattern is skewed and pulled somewhat side-ways rather than the full till effect when the implement is tracking properly in a straight forward position. Second, ridges are created in the soil caused by packing wheels being skewed over the direction of travel. Third, failure to maintain 'on-row-packing' because the packing wheels are not aligned over the seed rows. Fourth, 'ridging' caused by the air cart front castor wheels skewing from a forward alignment when the air cart is out of line with the direction of travel. Fifth, when the cultivator reaches the end of a row and turns around, there is a tremendous stress placed on the cultivator when the air cart turns. This effect is similar to 'crack the whip'. Complicating these issues, is the need to be able to easily transport the cultivator and air cart from field to field. After field operations, the cultivator is converted from the field mode to more compact transport mode. Typically, this involves folding the wings of the cultivator towards the center of the cultivator (as seen in FIG. 12). It is important to be able to maintain the air cart securely during transport. It would also be advantageous to minimize the operator's duties when setting up the cultivator and air cart for either transport or field modes.

The prior art has typically focused on using a cultivator hitch as illustrated in FIG. 2. This results in 2 attachment points on the cultivator and 1 attachment on the air cart. This design creates a large moment arm ($d_{hp}$) from the tractor hitch 8 to the air cart 2. This large moment arm results in undesirable forces be placed on the cultivator creating the previously discussed problems.

Consequently, the need exists for an adjustable cultivator hitch for towing an air cart. Furthermore, the hitch needs to be capable of allowing the cultivator to be adjusted from the field mode to the transport mode with a minimum of operator intervention.

OBJECTS OF THE INVENTION

It is an object of the present invention to provide an adjustable cultivator hitch for towing an air cart.

It is a further object of the present invention to provide a cultivator hitch that can change between field and transport modes.

It is a further object of the present invention to provide an adjustable cultivator hitch for towing an implement while minimizing stripping and other problems caused by the sliding effect.

It is a further object of the present invention to provide an adjustable hitch that can be operated by the farmer with a minimum of intervention.

It is a further object of the present invention to provide an adjustable hitch that can be locked in either the field mode or transport mode.

It is a further object of the present invention to provide an adjustable hitch that does not require that the farmer adjust the air cart hitch.

It is a further object of the present invention to provide an adjustable hitch that pivots in the center.

It is a further object of the present invention to provide an adjustable cultivator hitch that reduces skewing of the implement so the packers are more accurately packing on the planted rows.

SUMMARY OF THE INVENTION

The invention overcomes the deficiencies of the prior art. The invention is an adjustable hitch for a cultivator for towing an air cart or similar pull-type implement. The invention consists of a pair of cultivator pivot arms pivotally attached to the cultivator frame. Expanding or contracting a pair of hydraulic cylinders pivots the arms. Attached to the arms is the hitch which each have a hitch pivot. Attached at the hitch end opposite of the cultivator are a pair of slides. These slides are inserted into a pair of slots located on an offset hitch at the front of the air cart. As the hydraulic cylinders move the pivot arms, the hitch pivots about the hitch pivot. The slides on the hitch slideably move within the slots on the offset hitch of the air cart. The adjustable hitch also has a field latch assembly and transport latch assembly controlled by the hydraulic cylinders. Two transport latches contact two catches to secure the hitch while transporting the cultivator. The latches are spring biased and are released when the cylinders extend. There is also a single field latch assembly having a latch and a catch. A single hydraulic cylinder acts to release the latch when one of the hydraulic cylinders retracts.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
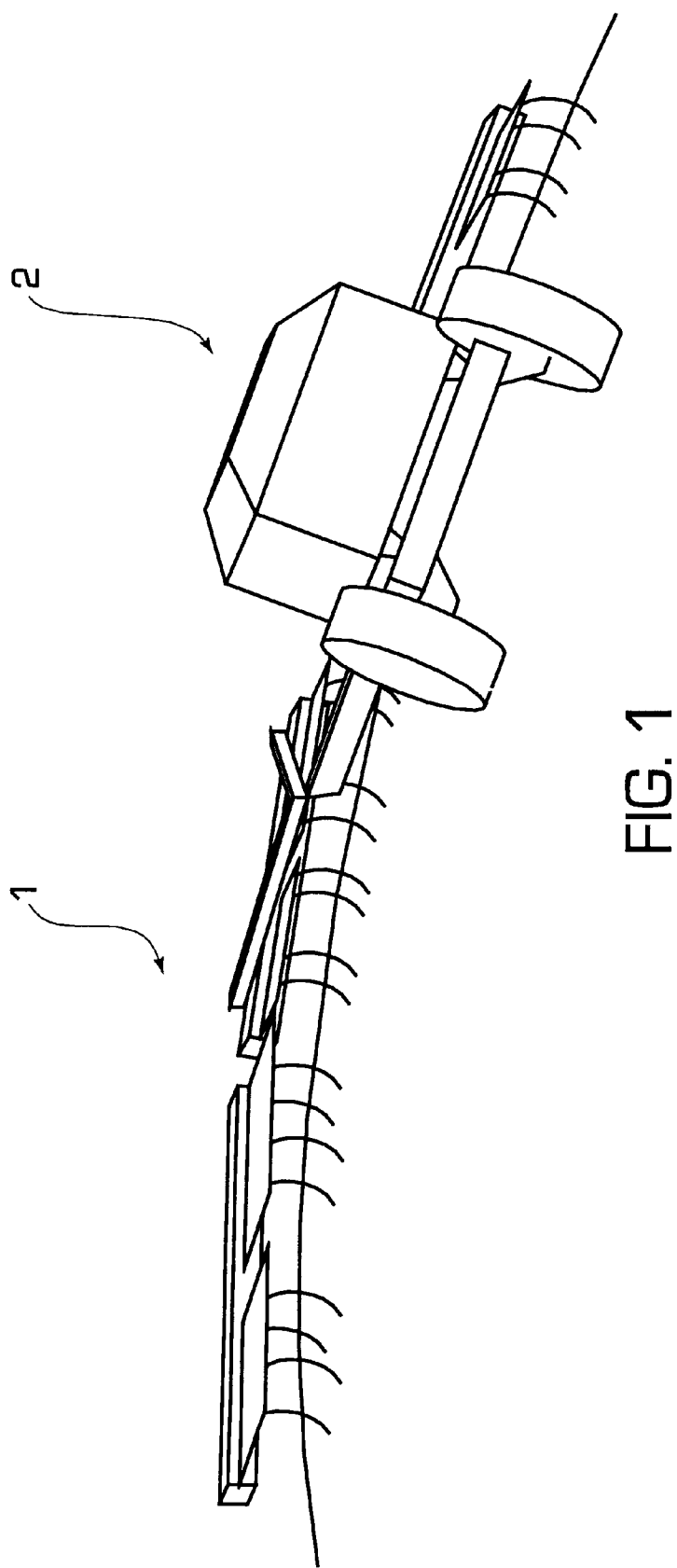
FIG. 1 is a side schematic view of a cultivator and air cart moving over a hill.

Referring to the drawings, it is possible to observe the major elements and general operation of the present invention. Left and right references are used as a matter of convenience and are determined by standing at the rear of the tillage device or cultivator and facing the forward end in the normal direction of travel when the tillage device or cultivator is operating in the field. Likewise, forward and rearward are determined by normal direction of travel in the field mode of the tillage device or cultivator. Upward or downward orientations are relative to the ground or operating surface. Horizontal or vertical planes are also relative to ground.

Figure 2:
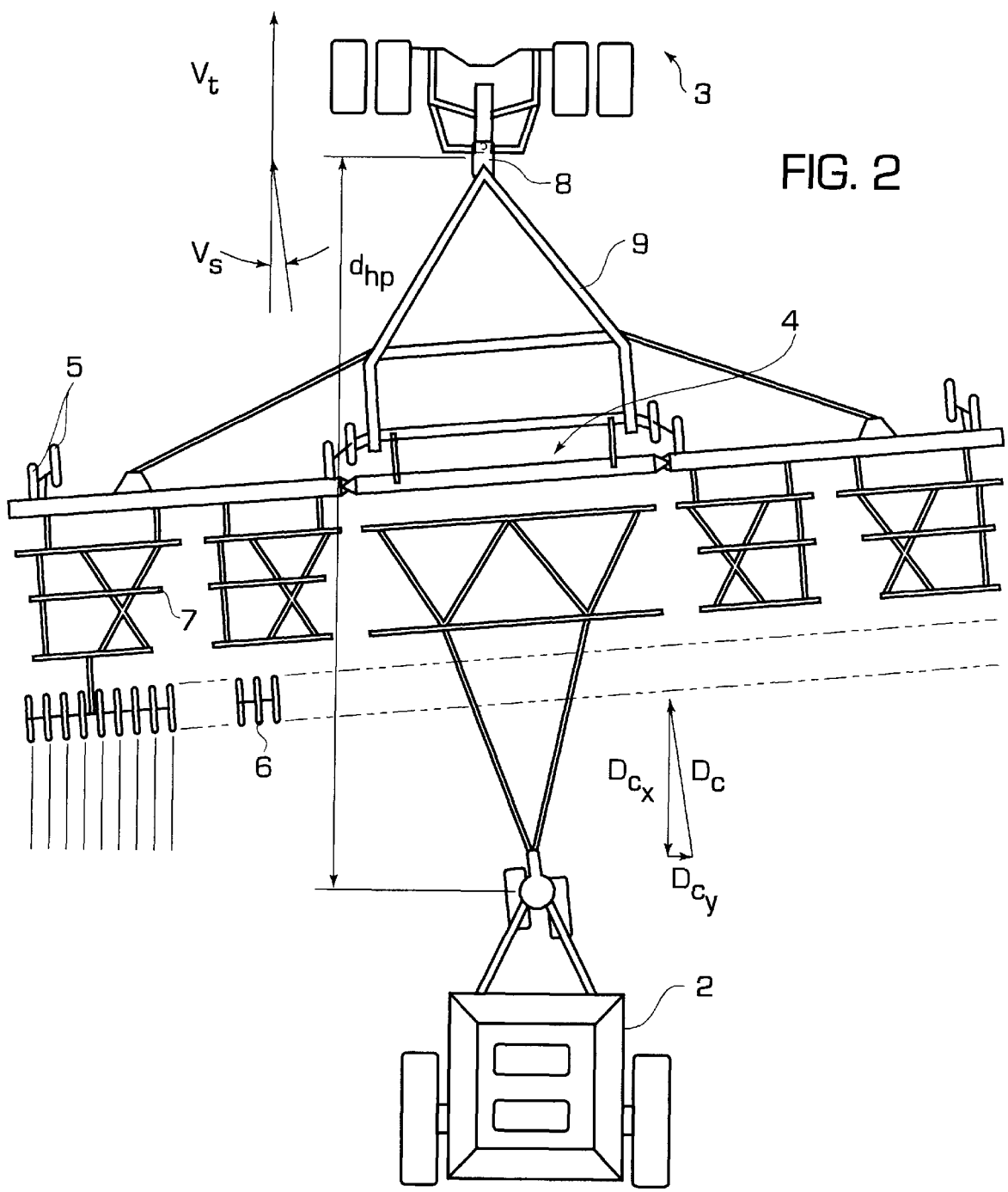
FIG. 2 is an overhead view of a tractor, pulling a cultivator that is towing an air cart.
Figure 3:
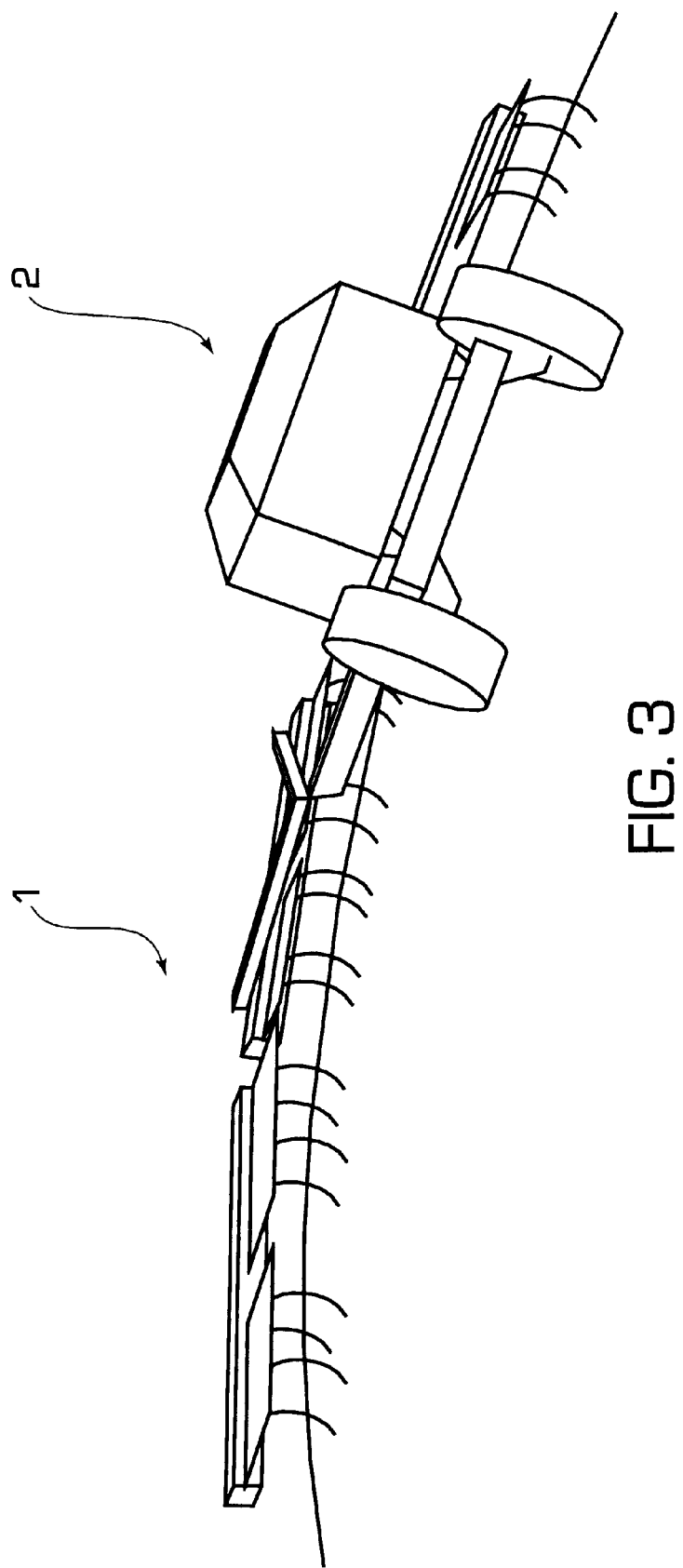
FIG. 3 is a side schematic view of a cultivator and air car cart moving over a hill.
Figure 4:
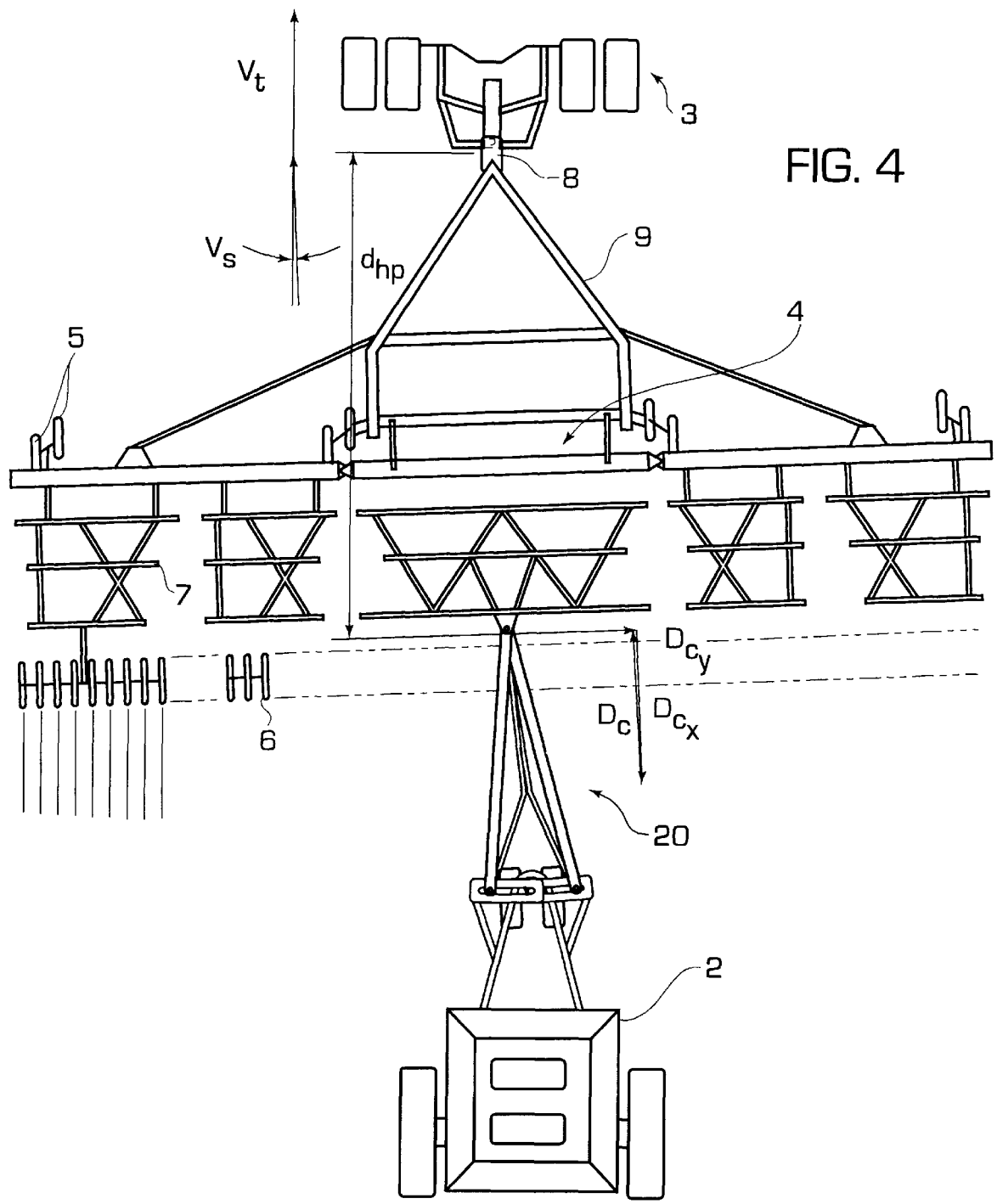
FIG. 4 is an overhead view of a tractor, cultivator with the adjustable hitch for towing the air cart.

FIG. 4 illustrates a general overhead view of a pull-type tillage device or cultivator that the present invention is located. A tillage device or cultivator consists of several implements working together. A tractor 3 pulls the cultivator 2 and the cultivator 2 pulls an air cart 2. The cultivator 2 is attached to the tractor 3 by a tractor hitch 8 through a cultivator hitch frame 9. A modem cultivator 1 consists of several elements. There is a center section 4 surrounded by folding wings. Each wing and center section has a tool bar 7. Attached to the tool bars 7 are conventional ground-working tools (not shown). Such tools include coulters, discs, plows, air seeders and/or spray or air injection devices. Castor wheels 5 at the front and packing wheels 6 at the rear support the wings and center section. Trailing behind the cultivator 1 is the air cart 2. The typical air cart 2 can contain herbicides, pesticides or seeds that are blown by air to the ground-working tools on the cultivator. This technology is well known in the art. The air cart 2 is attached to the cultivator by the adjustable hitch 20. While the operator is performing various tillage operations (or field mode), the hitch is configured as seen in FIG. 4. Specifically there is a single, vertical pivot point axis on the cultivator. When the air cart 2 is being transported between fields (as seen in FIG. 2), there are two connection points on cultivator and a single vertical pivot point axis on the air cart 2. In the prior art, the moment arm extended from the tractor mount 8 to the air cart 2 ($d_{hp}$) as seen in FIG. 2. The present design decreases the moment arm so that its length is now from the tractor mount to the end of the cultivator ($d_{hi}$). This decrease of the moment arm decreases the lateral force ($d_{cy}$) placed on cultivator. This decreases results in better alignment of the implements on the toolbar 7 and the packing wheels 6.

Figure 7:
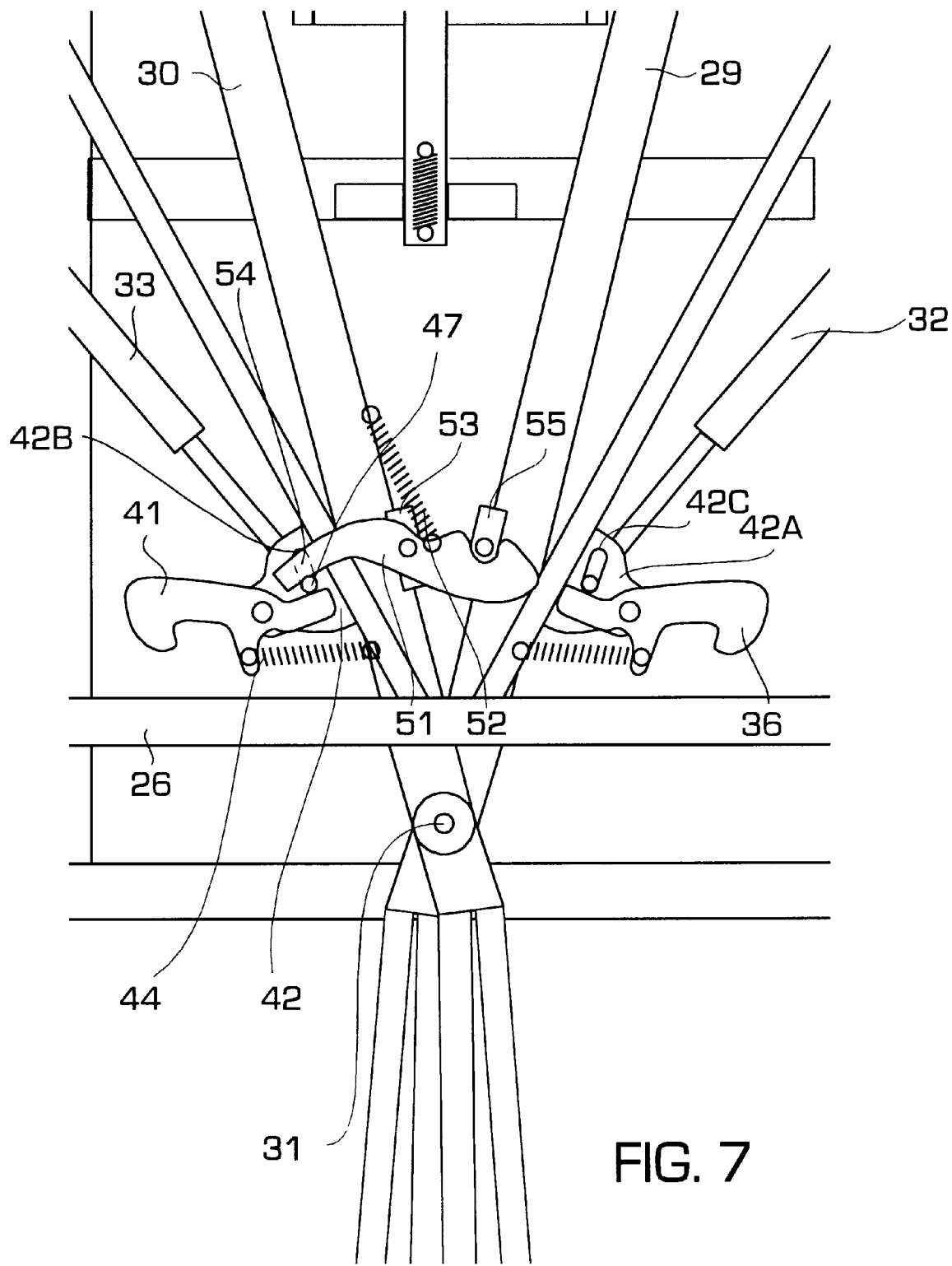
FIG. 7 is close-up, overhead view of the cultivator illustrating the present invention in the field mode.
Figure 8:
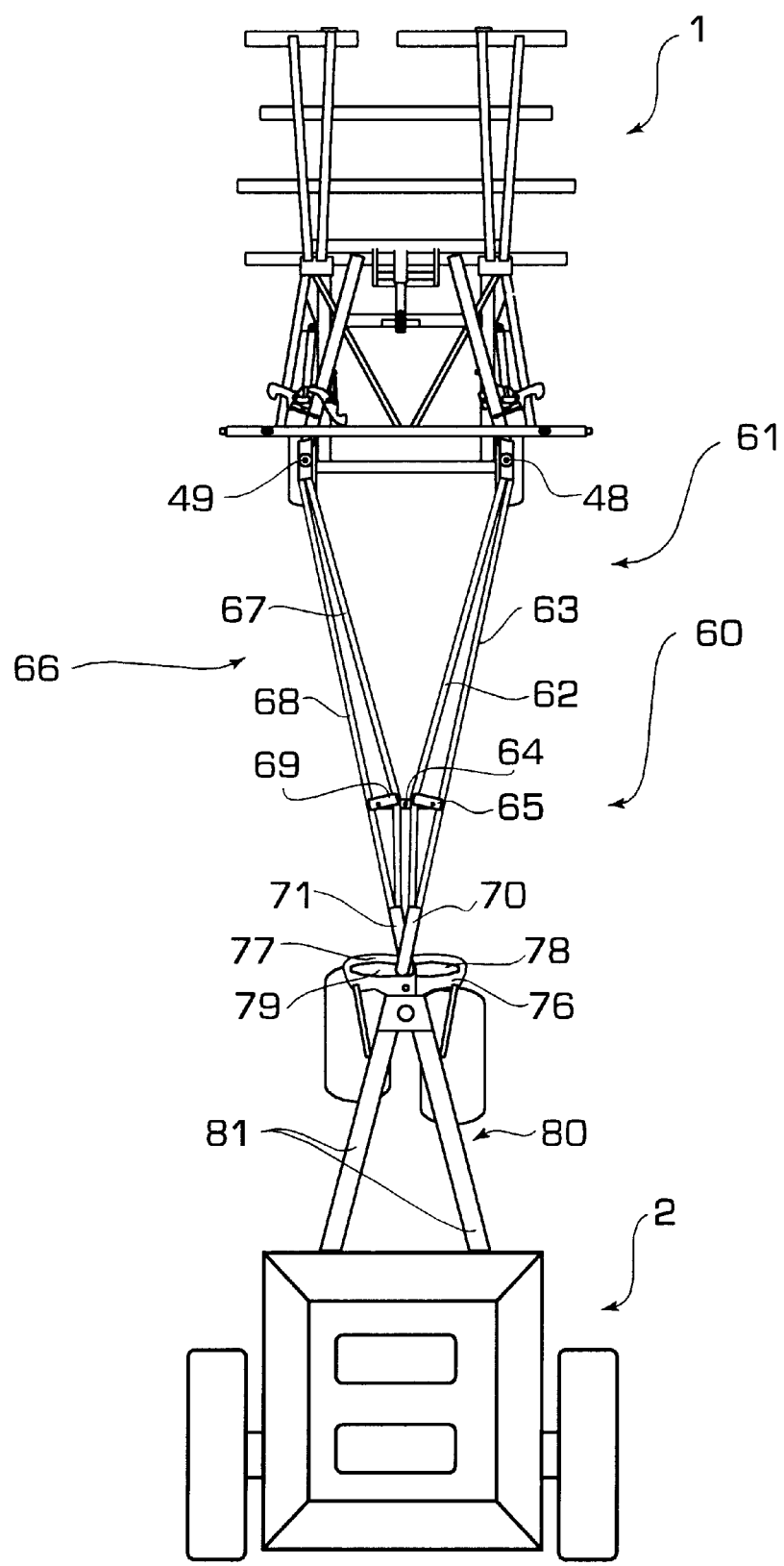
FIG. 8 is an overhead view of the cultivator, adjustable hitch and air cart while the adjustable hitch is in the transport mode.
Figure 9:
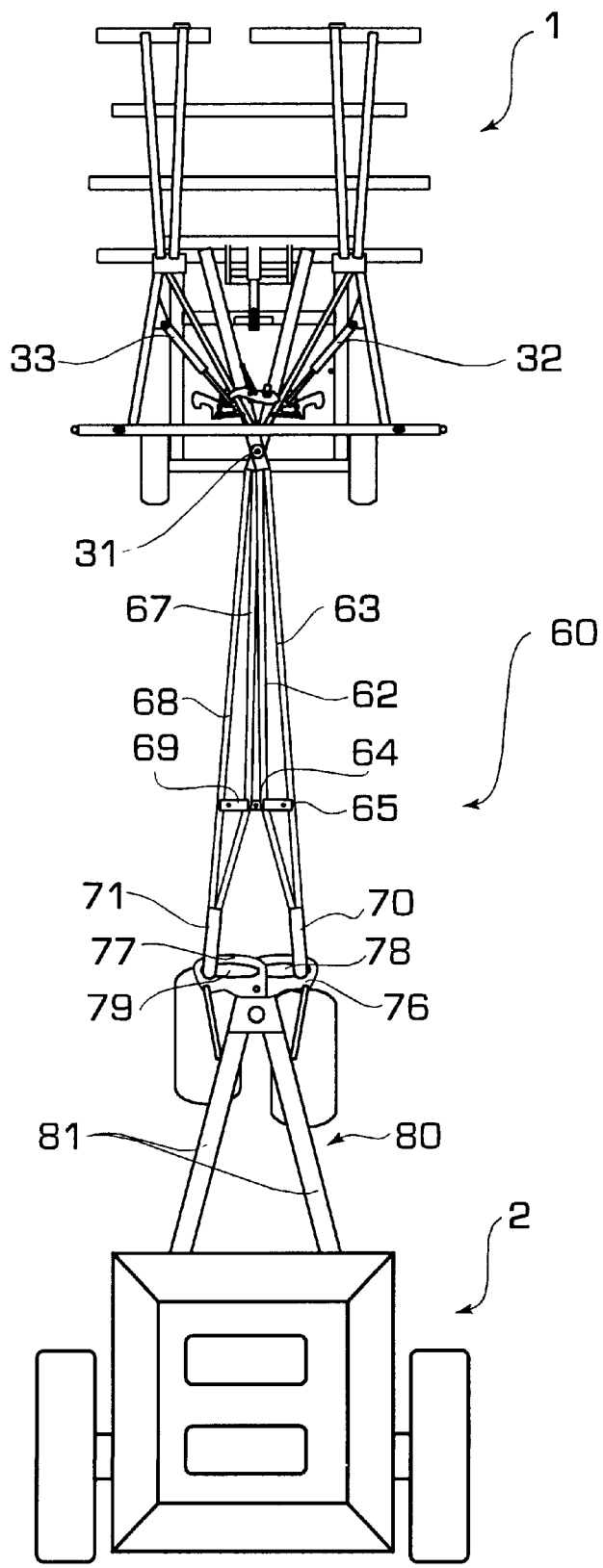
FIG. 9 is an overhead view of the cultivator, adjustable hitch and air cart while the adjustable hitch in the field mode.

The adjustable cultivator hitch 20 consists of several elements, which may generally be seen, in FIGS. 8 and 9. FIG. 8 shows the hitch 20 in the transport mode and FIG. 9 shows the hitch 20 in the field mode. A portion of the hitch 20 is controlled from the cultivator 1. These elements are detailed in FIGS. 5, 6 and 7. The hitch 60 extends between the cultivator 1 and air cart 1. The hitch 20 pivots at the hitch pivot 64. At cultivator end of the hitch 60, the hitch 60 pivots at the first pivot 48 and second pivot 49. At the air cart 2 end of the hitch 60, the hitch 60 can expand or contract in the first slot 78 or second slot 79.

Figure 5:
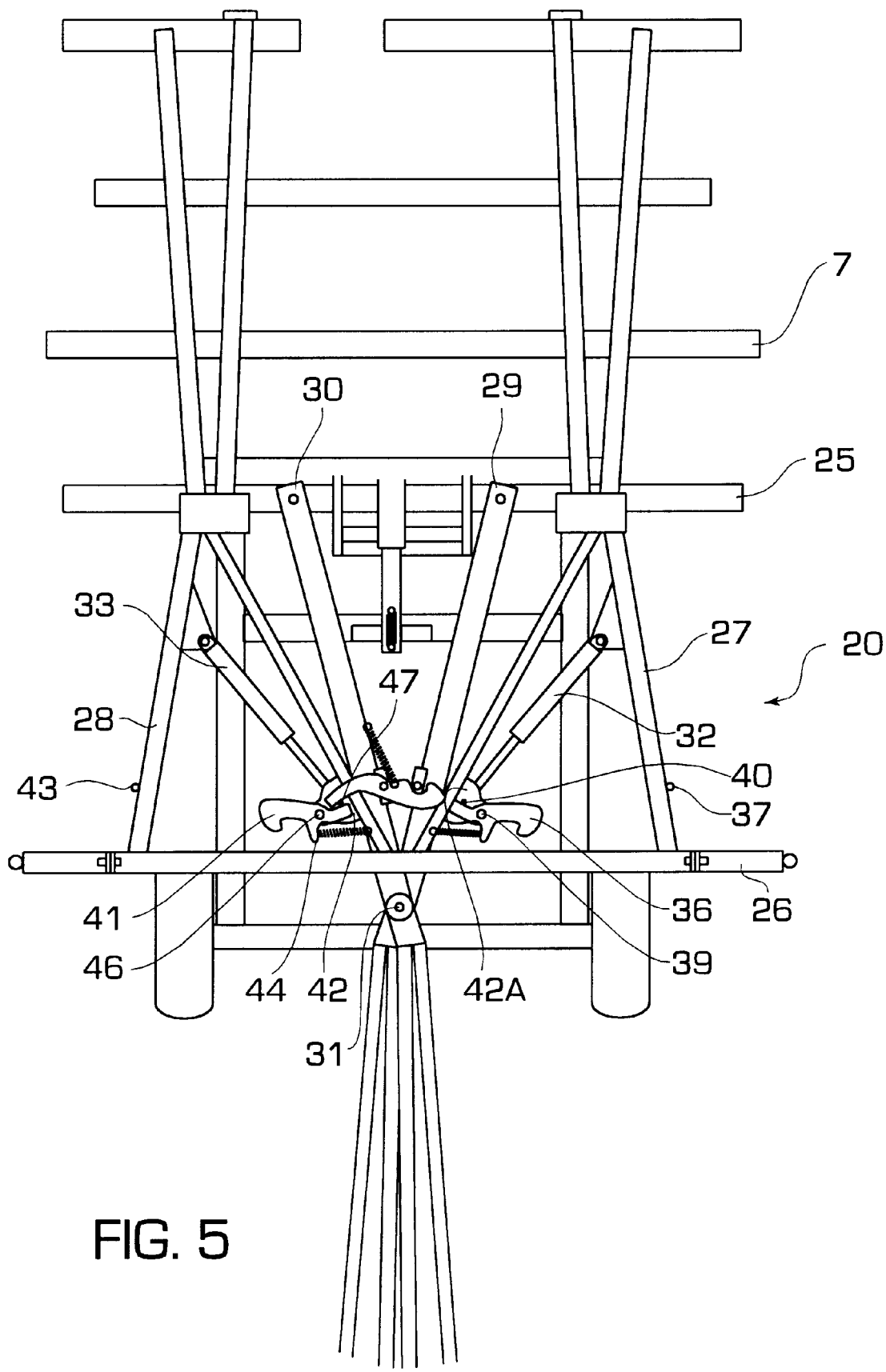
FIG. 5 is an overhead view of the cultivator illustrating the present invention in the field mode.
Figure 6:
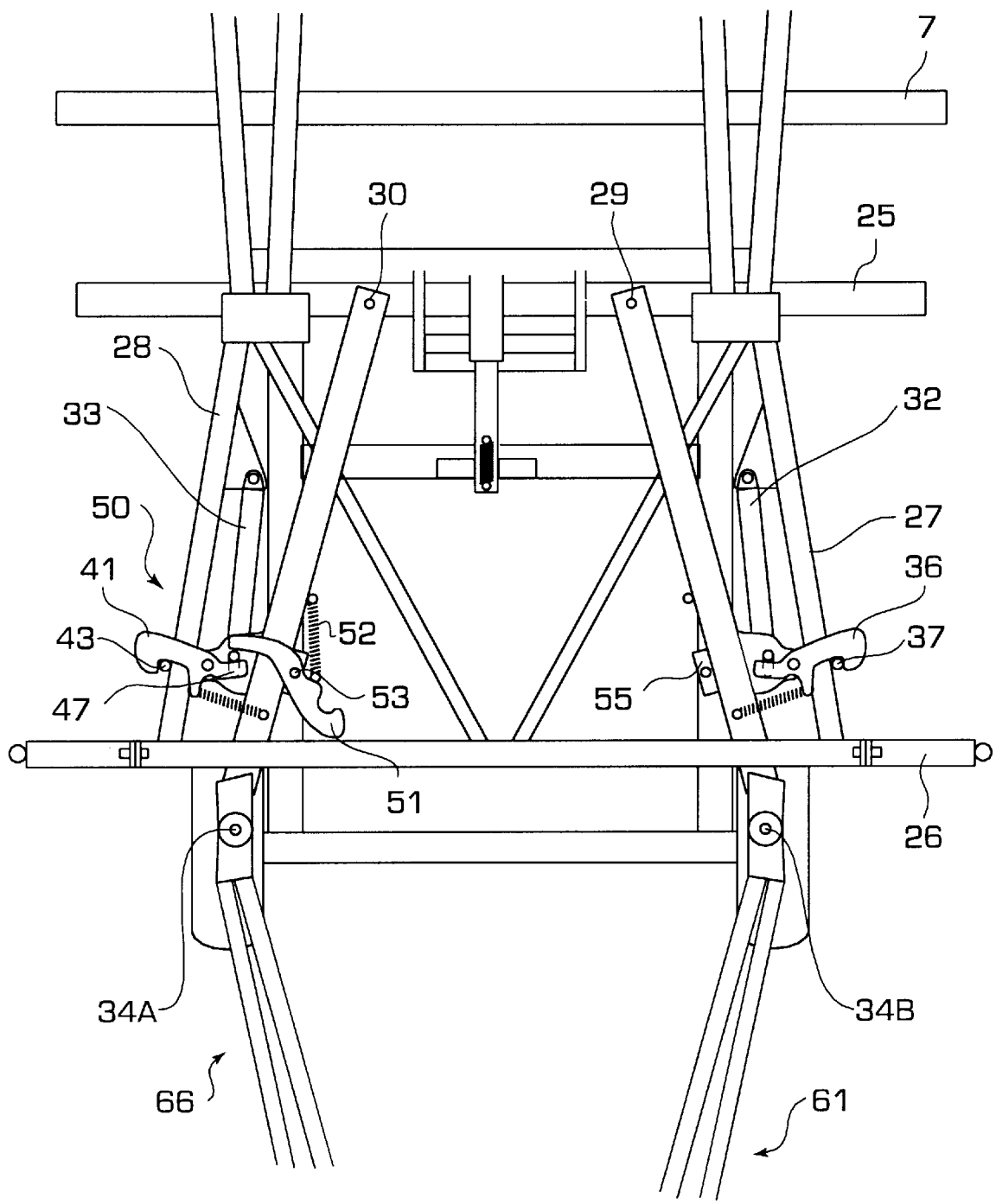
FIG. 6 is an overhead view of the cultivator illustrating the present invention in the transport mode.

Viewing the cultivator end of the hitch 60, as seen in FIGS. 5, 6 and 7 it is possible to understand the operation of the adjustable hitch 20. Pivotally attached to the cultivator frame 25 are the first cultivator pivot arm 29 and second cultivator pivot arm 30. Also mounted to the cultivator frame 25 is the first cultivator support 27 and second cultivator support 28. Attached to first cultivator support 27 and second cultivator support 28 is the cultivator slide frame 26. The cultivator slide frame 26 is horizontal to the ground and perpendicular to the normal direction of travel. The hitch 60 is pivotally attached at the ends of the first cultivator pivot arm 29 and second cultivator pivot arm 30 by the first pivot 48 and second pivot 49. As seen in FIG. 5, the first pivot 48 and second pivot 49 are aligned on a vertical axis to the ground and to the direction of travel 31. Controlling the movement of the first 48 and second pivot 49 along the cultivator slide frame 26 are a pair of hydraulic cylinders attached to the first cultivator pivot 29 and second cultivator pivot arm 30. The first hydraulic cylinder 32 is pivotally attached to the first cultivator support 27. The opposite end is attached (and controls) to the transport latch assembly 35, which is mounted to the first cultivator pivot arm 29. The second hydraulic cylinder 33 is pivotally attached to the second cultivator support 33. The opposite end is attached to the transport latch and field latch assembly, which is attached to the second cultivator pivot arm 30. When the hydraulic cylinders are expanded, the pivot arms 30 and 31 move the first and second pivots 48 and 49 into alignment and into the field mode. Conversely, when the hydraulic cylinders are contracted, the pivot arm 30 and 31 move the first and second pivots 48 and 49 towards opposite ends of the cultivator slide frame 26. This places the hitch into the transport mode.

In order to secure the hitch 20 in either the field mode or transport mode there is a transport latch assembly 35 and field latch assembly 50 that are controlled by the hydraulic cylinders 32 and 33. The transport latch assembly (which is engaged in FIG. 6) consists of a pair of spring-biased latches that catch on the first and second cultivator supports 27 and 28. Specifically, there is a first transport latch 36 which is pivotally attached by the first transport pivot 39 to the first bracket 42a. The first bracket 42a is mounted on the first cultivator pivot arm 29. The latch 36 hooks onto a first transport catch 37. There is a first transport spring 39 which biases the latch 36 into the closed position about the catch 37. The first hydraulic cylinder 32, when extended, pushes rotates the latch 36 counter clockwise (as viewed in FIGS. 5, 6 and 7) releasing the latch 36 from the catch 37. This allows the first pivot point 48 to slide along the cultivator slide frame 26 into the field mode position. When the first hydraulic cylinder 32 is contracted, the first cultivator pivot arm 29 is pulled outwards. The transport spring 39 pulls the latch 36 clockwise and contacts the catch 37 in a conventional manner. The second transport latch 41 operates in a similar manner. The second hydraulic cylinder 33 rotates the second transport latch 41 which is pivotally attached to a second bracket 42. The second bracket 42 is attached to the second cultivator pivot arm 30. There is also a second transport spring 44 which biases the latch 41. Again, the spring is attached to the second cultivator pivot arm 30 and latch 41. The latch 41 contacts a second transport catch 43. It should be noted that the first and second brackets 42a and 42 both have bracket slots 42c and 42b which allow the hydraulic cylinders to slideably attach to the bracket and push the latch 36 or 41. As previously stated, the first transport latch 36 operates the same and second transport latch 41. However, the second transport latch also is proximate to the field latch assembly 50. The field latch assembly 50 uses the same general principle as the transport latches. The field latch assembly 50 has a field latch 51 which is pivotally attached to the second pivot arm 30 by the field pivot 53. There is field spring 52 attached to the field latch 51. Again, the spring 52 biases the latch 51 in contact with the field catch 55. The field catch 55 is attached to the first cultivator pivot arm 29. When the latch 51 is in contact with the catch 55, the first pivot 48 and second pivot 49 are vertically aligned as seen in FIG. 7. The second hydraulic cylinder 33 controls the field latch 51. The second hydraulic cylinder 33 contracts to rotate the latch 51 out of contract with the catch 55. This allows the first pivot 48 and second pivot 49 to slide along the cultivator slide frame 26 to the transport position.

Pivotally attached to the first pivot 48 and second pivot 49 is the hitch 60. As the first pivot 48 and second pivot 49 are moved between field and transport modes, the hitch 60 pivots about the hitch pivot 64. The hitch 60 consists of a first hitch frame 61. The hitch frame 61 has a first inner frame 62 and first outer frame 63. The hitch also has a second hitch frame 66 having a second inner frame 67 and a second outer frame 68. Connecting the first inner frame 62 and first outer frame 63 is the first support 65. Connecting the second inner frame 67 and second outer frame 68 is the second support 69. The first support 65 and second support 69 are pivotally attached at the hitch pivot 64. The hitch pivot 64 is a cross member that is shaped like an 'H' to which the first hitch flame 61 and second hitch frame 66 are pivotally attached. FIGS. 10–14 illustrate the pivot hitch 64. The hitch pivot 64 could be a variety of shapes besides the disclosed 'H' shaped bracket. The 'H' shaped bracket provides tolerance in case the pivotal connection at the first or second hitch frame 61 or 66 are not precisely and equally located on the hitch frame, in which case there would be stress when attempting to bring one pair of the ends into alignment as a common joint as in the transport or field modes (which will be discussed in greater detail below). At the hitch end opposite to the cultivator 1, where the air cart 2 is located, is the first cart slide 70 and second cart slide 71 are attached to the first hitch frame 61 and second hitch frame 66, respectively.

Attached to the front of the air cart 2 is the air cart frame 80. The air cart frame 80 supports the first hitch 76 and second hitch 77. These hitches are offset from each other when viewed from the horizontal plane. Also supporting the hitches are a pair of air cart hitch supports 81. Each hitch 76 and 77 has a slot 78 and 79 for receiving the cart slides 70 and 71. The first slot 78 receives the first slide 70 and the second slot 79 receives the second slide 71. As seen in FIGS. 8 and 9, as the adjustable hitch 20 is moved from the transport mode (FIG. 8) to the field mode (FIG. 9), the slides 70 and 71 move away from each other in the slots 78 and 79. At the same time, the first hitch frame 61 and second hitch frame 66 pivots about the hitch pivot 64 to accommodate this motion.

Figure 10:
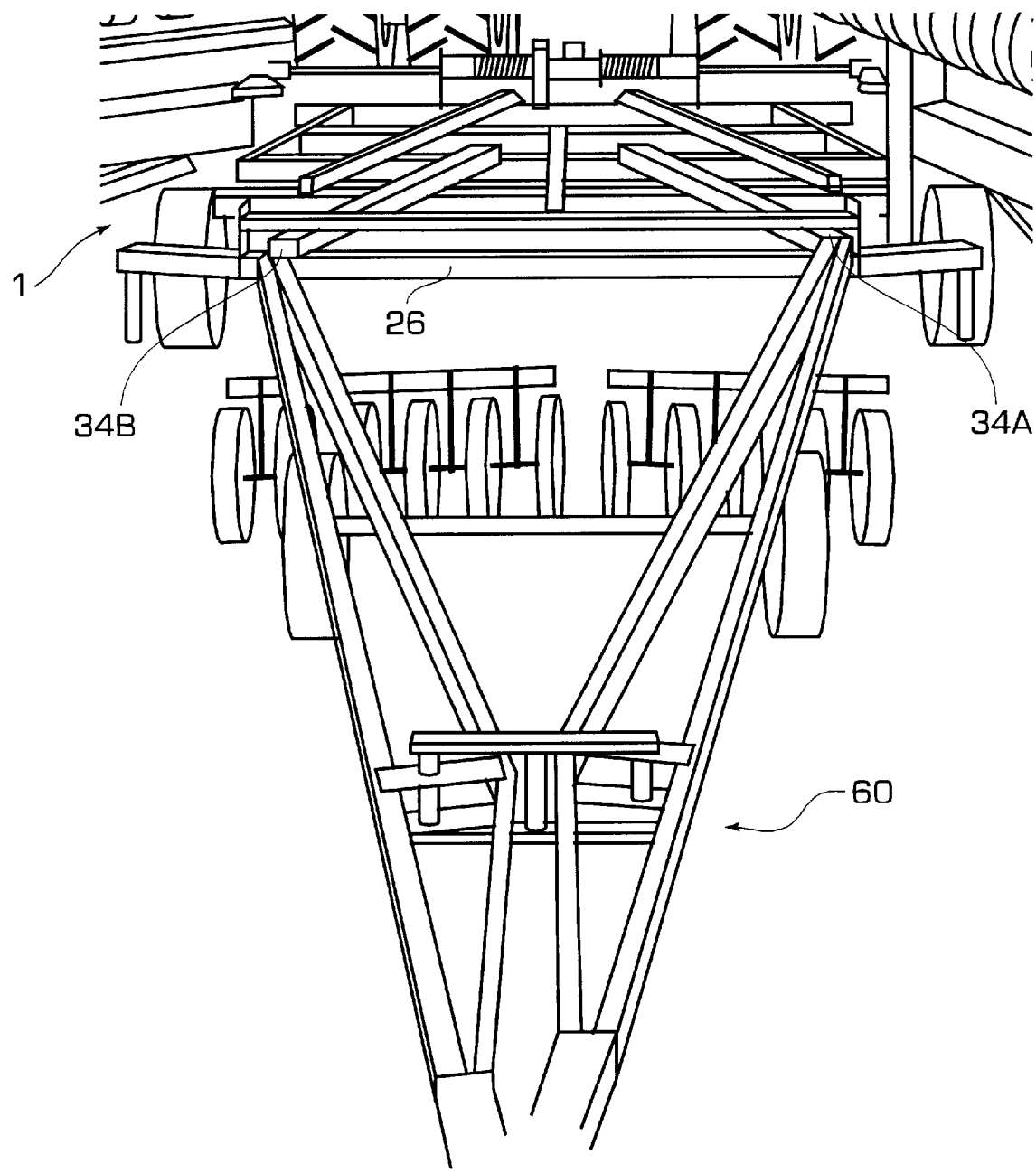
FIG. 10 is a side view from the air cart showing the adjustable hitch in the transport mode.
Figure 11:
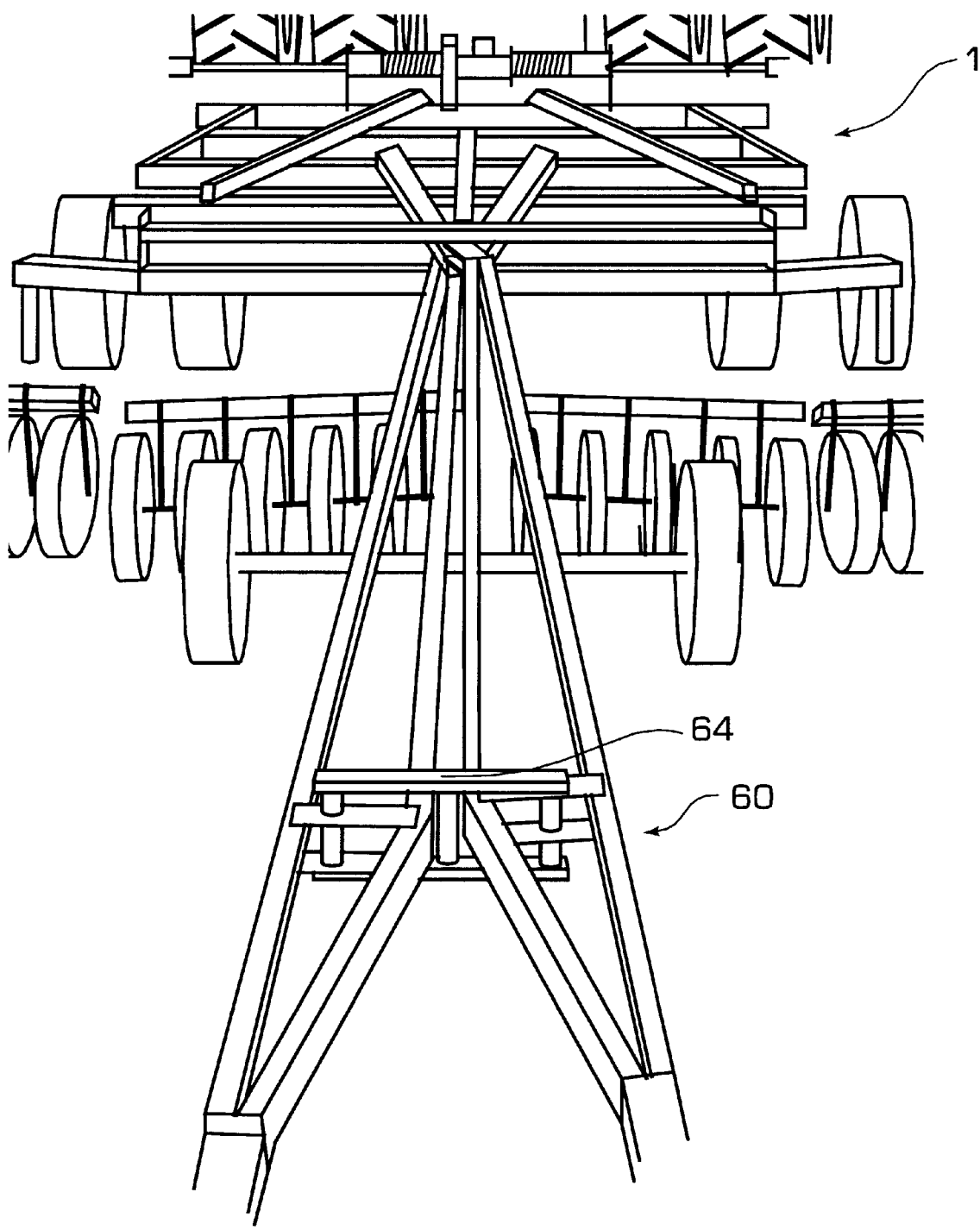
FIG. 11 is a side view from the air cart showing the adjustable hitch in the field mode.
Figure 12:
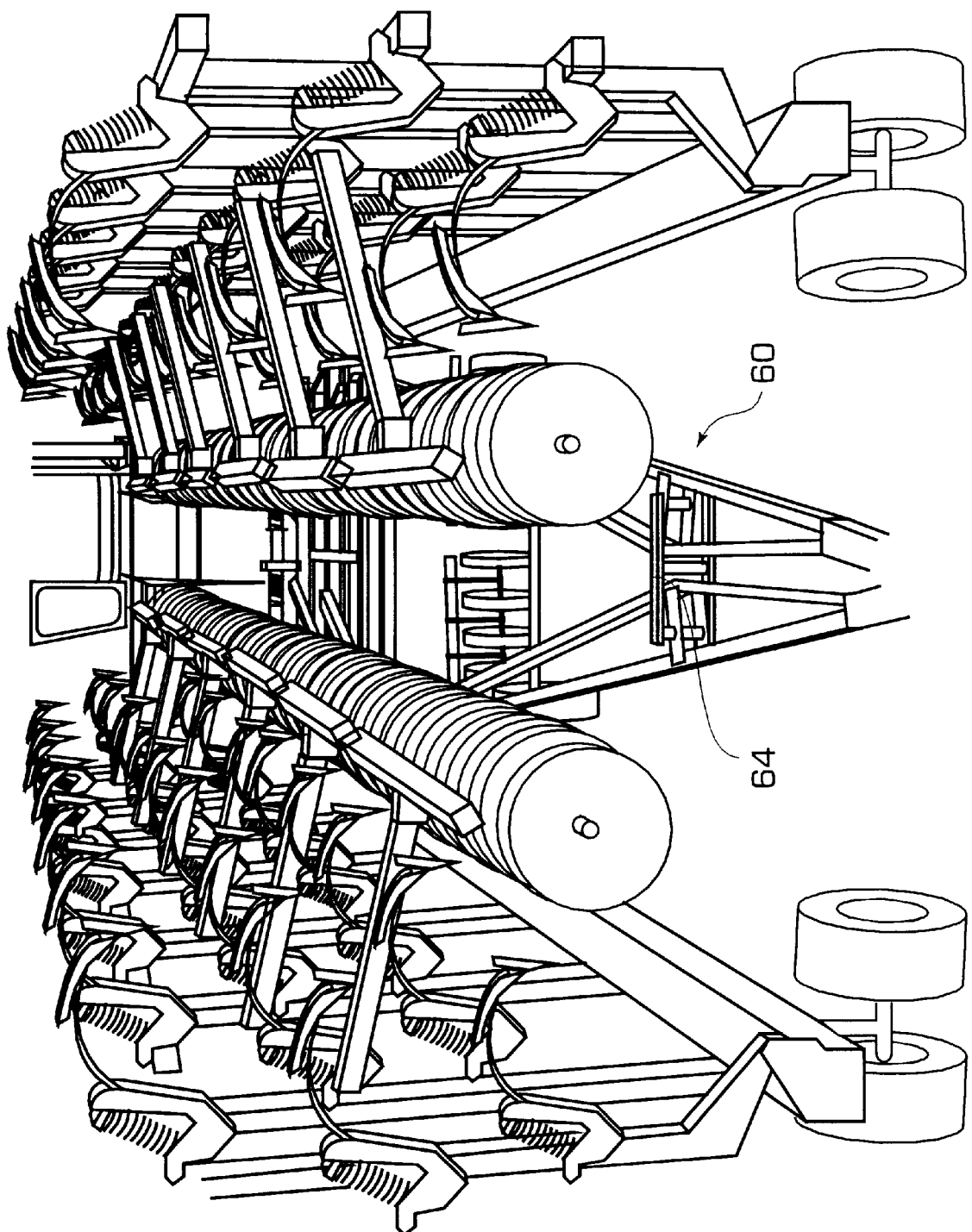
FIG. 12 is a rear view from the air cart showing the adjustable hitch and cultivator in the transport mode.
Figure 13:
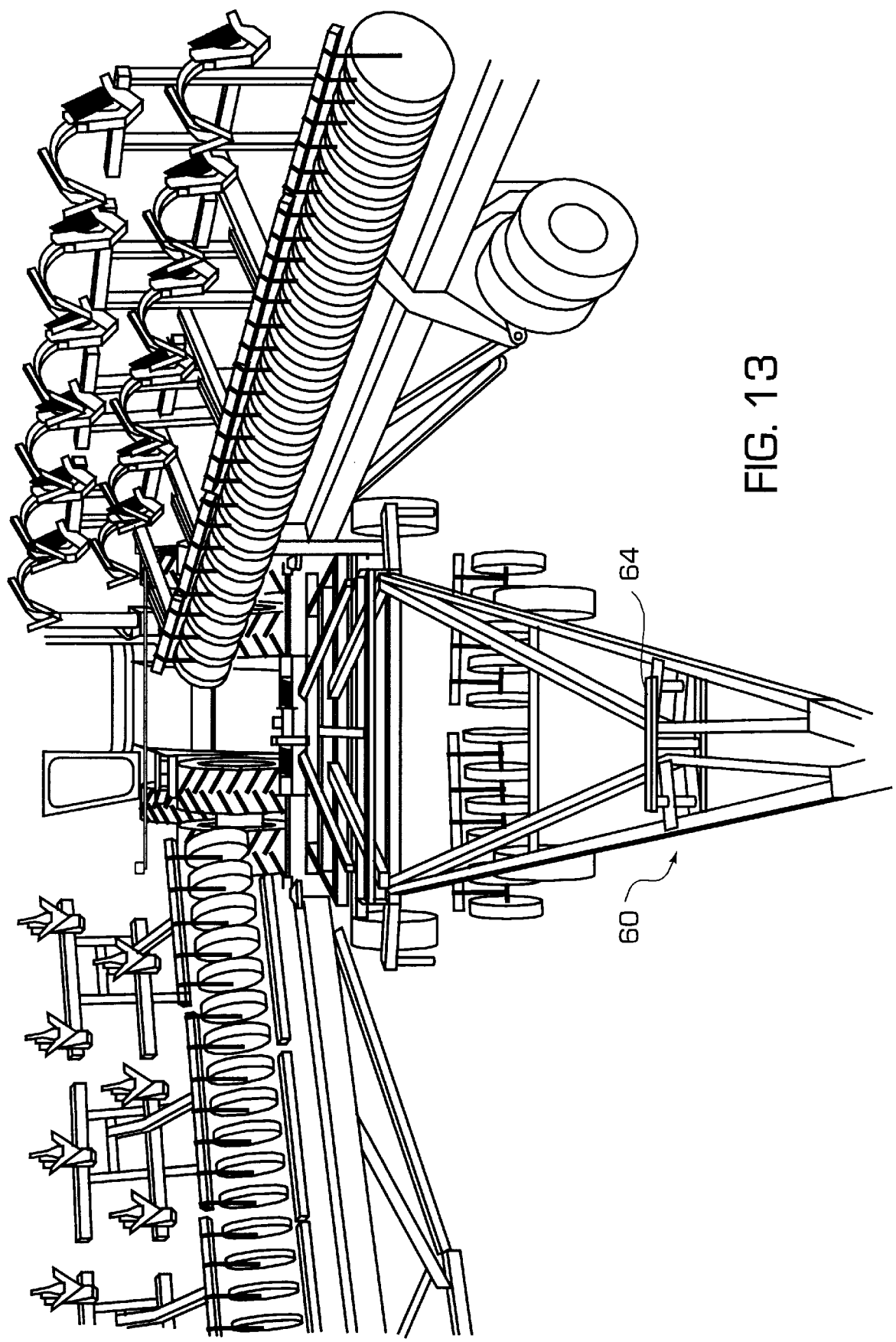
FIG. 13 is a rear view from the air cart showing the adjustable hitch in the transport mode and the cultivator between the field and transport mode.
Figure 14:
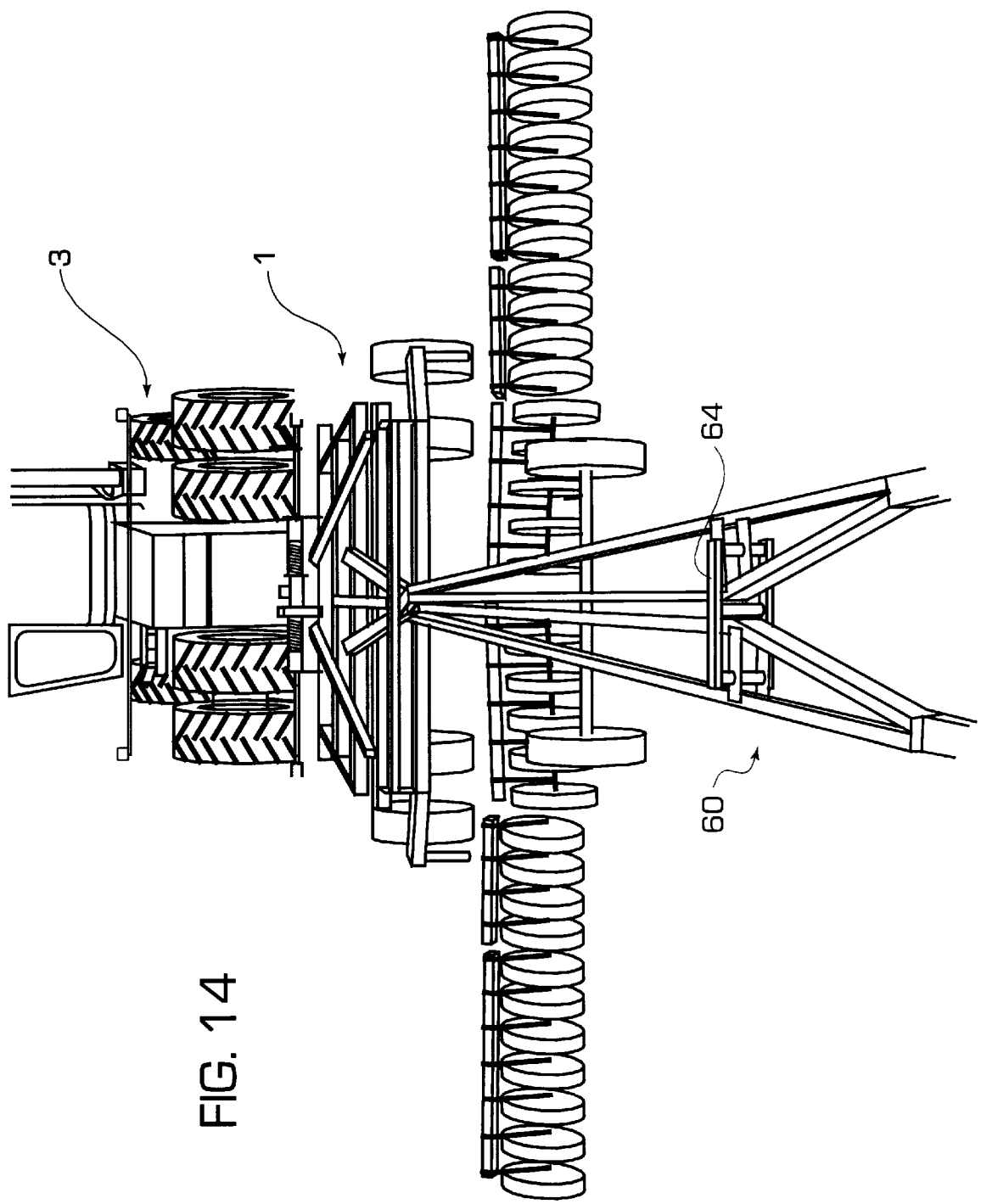
FIG. 14 is a rear view from the air cart showing the adjustable hitch in the field mode and the cultivator in the field mode.

FIGS. 10, 11, 12, 13 and 14 further illustrate the transition from the transport mode (FIGS. 10, 12 and 13) to the field mode (FIG. 11 and 14). FIG. 10 illustrates the first pivot and second pivot 48 and 49 at opposite ends of the cultivator slide frame 26 and the first slide 70 and second slide 71 are vertically aligned. It should be noted that FIG. 10 shows how the first and second pivots 48 and 49 are offset when viewed from this horizontal plane. Likewise, the first hitch 76 and second hitch 77 are also offset when viewed from the horizontal plane. FIG. 11 shows the hitch in the field mode. Note how the first and second pivots 48 and 49 are now aligned on a vertical axis. Further, the first slide 70 and second slide 71 are at opposite ends of the slots 78 and 79. FIGS. 12, 13 and 14 show the adjustable hitch moving from the transport mode to the field mode.

It will be obvious to those skilled in the art that various changes may be made without departing from the scope of the invention and the invention is not to be considered limited to what is illustrated in the drawings and described in the specification.

What is claimed is:

1. An adjustable cultivator hitch for towing an air cart, comprising:
   a. a cultivator frame;
   b. a pair of cultivator supports, each support perpendicularly attached to the cultivator frame;
   c. a cultivator slide frame attached to each cultivator support;
   d. a pair of cultivator pivot arms, each arm pivotally attached to the cultivator frame;
   e. a transport latch assembly pivotally attached to each cultivator pivot arm;

f. a field latch assembly pivotally attached to a single cultivator pivot arm;

g. a pair of hydraulic cylinders, each cylinder pivotally attached to the cultivator support and controlling the field latch assembly and the transport latch assembly;

h. a pair of hitch frames, each hitch frame pivotally attached to each cultivator pivot arm;

i. a pair of cart slides affixed to the hitch frame; and j. a hitch affixed to an air car frame; said hitch having a pair of slots therein, each said slot for slideably holding each cart slide.

2. The adjustable cultivator hitch described in claim 1, wherein said pair of cultivator pivot arms further comprise a first cultivator pivot arm and second cultivator pivot arm, and said pair of hydraulic cylinders further comprises a first hydraulic cylinder and second hydraulic cylinder, and said pair of cultivator supports further comprises a first cultivator support and second cultivator support.

3. The adjustable cultivator hitch described in claim 2, wherein said transport latch assembly comprises:

a. a first bracket attached to the first cultivator pivot arm;

b. a first transport latch pivotally attached to the first bracket;

c. a first transport catch affixed to the first cultivator support arm;

d. a first transport spring affixed between the first pivot arm and first transport latch;

e. said first bracket having a first bracket slot, therein, said slot for receiving said first hydraulic cylinder whereby said first cylinder contacts the first transport latch;

f. a second bracket attached to the second cultivator pivot arm;

g. a second transport latch pivotally attached to the second bracket;

h. a second transport catch affixed to the second cultivator support arm;

i. a second transport spring affixed between the second pivot arm and second transport latch; and j. said second bracket having a second bracket slot, therein, said second slot for receiving said second hydraulic cylinder whereby said second cylinder contacts the second transport latch.

4. The adjustable cultivator hitch described in claim 3, wherein said field latch assembly comprises:

a. a field latch pivotally attached to the second cultivator pivot arm;

b. a field catch affixed to the first cultivator support arm;

c. a field spring affixed between the second pivot arm and field latch; and d. said field latch contacted by the second hydraulic cylinder.

5. The adjustable cultivator hitch described in claim 4, wherein said pair of hitch frames further comprises a first hitch frame and a second hitch frame, said first hitch frame having a first slide, a first support, a first inner hitch and first outer hitch, said second hitch frame having a second slide, a second support, a second inner hitch and second outer hitch, said first hitch pivotally connect to the second through the first support and second support.

6. The adjustable cultivator hitch described in claim 5, wherein the first cultivator pivot arm is pivotally attached to the first hitch frame by a first pivot and the second cultivator pivot arm is pivotally connected to the second hitch frame by a second pivot, whereby the first pivot and second pivot move parallel to the cultivator slide frame.

7. The adjustable cultivator hitch described in claim 6, wherein the pair of cart slides attached to the air cart frame further comprises:

a. a first hitch having a first slot, therein, said first slot for slideably receiving the first slide; and b. a second hitch having a second slot, therein, said second slot for slideably receiving the second slide.

8. The adjustable cultivator hitch described in claim 7, wherein said cultivator slide frame is horizontal to a travel surface and perpendicular to a direction of travel wherein said first pivot and said second pivot move parallel to the cultivator slide frame.

9. The adjustable cultivator hitch described in claim 8, wherein said first pivot and said second pivot move in offset planes.

10. The adjustable cultivator hitch described in claim 9, wherein first slot and second slot are horizontal to a travel surface and perpendicular to a direction of travel.

11. The adjustable cultivator hitch described in claim 10, wherein the first slide and second slide move in offset planes.

12. An adjustable cultivator hitch for towing a second agricultural implement, comprising:

a. a cultivator frame;

b. a first cultivator pivot arm and a second cultivator pivot arm, each pivot arm pivotally attached to the cultivator frame;

c. a first cultivator support frame and a second cultivator support, each cultivator support affixed to the cultivator frame;

d. a first hydraulic cylinder pivotally attached to the first cultivator support and the first cultivator pivot arm;

e. a second hydraulic cylinder pivotally attached to the second cultivator support and the second pivot arm;

f. a first hitch frame pivotally attached to the first cultivator pivot arm, the first hitch frame having a first cart slide;

g. a second hitch frame pivotally attached to the second cultivator pivot arm, the second hitch frame having a second cart slide;

h. said second towed implement having a frame, said frame supporting a first hitch and second hitch, said first hitch having a first slot, therein, for slideably receiving the first cart slide, said second hitch having a second slot, therein, for slideably receiving the second cart slide.

13. The adjustable cultivator hitch described in claim 12, further comprising a transport latch assembly, said transport latch assembly for controlling the movement of the first cultivator pivot arm and second cultivator pivot arm.

14. The adjustable cultivator hitch described in claim 13, further comprising a field latch assembly, said assembly attached to the second cultivator pivot arm.

15. The adjustable cultivator hitch described in claim 14, wherein the first hitch frame further comprises a first inner frame connected to a first outer frame by a first support.

16. The adjustable cultivator hitch described in claim 15, wherein the second hitch frame further comprises a second inner frame connected to a second outer frame by a second support, said second support pivotally attached to the first support.

17. In a ground-working cultivator, said cultivator pulled by a tractor and connect to the tractor by a tractor hitch, the cultivator having a plurality of toolbars, the cultivator supported by a plurality of caster wheels and packing wheels, the cultivator having a cultivator frame, the cultivator capable of towing an air cart by a cultivator hitch, the improvement comprising an adjustable cultivator hitch further comprising:

a. a first cultivator pivot arm and a second cultivator pivot arm, each pivot arm pivotally attached to the cultivator frame;
   b. a first cultivator support frame and a second cultivator support, each cultivator support affixed to the cultivator frame;
   c. a first hydraulic cylinder pivotally attached to the first cultivator support and the first cultivator pivot arm;
   f. a second hydraulic cylinder pivotally attached to the second cultivator support and the second pivot arm;
   g. a first hitch frame pivotally attached to the first cultivator pivot arm, the first hitch frame having a first cart slide;
   h. a second hitch frame pivotally attached to the second cultivator pivot arm, the second hitch frame having a second cart slide;
   i. said second towed implement having a frame, said frame supporting a first hitch and second hitch, said first hitch having a first slot, therein, for slideably receiving the first cart slide, said second hitch having a second slot, therein, for slideably receiving the second cart slide;
   j. a transport latch assembly further comprising:
      i. a first bracket attached to the first cultivator pivot arm;
      ii a first transport latch pivotally attached to the first bracket;
      iii. a first transport catch affixed to the first cultivator support arm;
      iv. a first transport spring affixed between the first pivot arm and first transport latch;
      v. said first bracket having a first bracket slot, therein, said slot for receiving said first hydraulic cylinder whereby said first cylinder contacts the first transport latch;
      vi. a second bracket attached to the second cultivator pivot arm;
      vii. a second transport latch pivotally attached to the second bracket;
      viii. a second transport catch affixed to the second cultivator support aim;
      ix. a second transport spring affixed between the second pivot arm and second transport latch; and
      x. said second bracket having a second bracket slot, therein, said second slot for receiving said second hydraulic cylinder whereby said second cylinder contacts the second transport latch; and
   k. a field latch assembly further comprising:
      i. a field latch pivotally attached to the second cultivator pivot arm;
      ii. a field catch affixed to the first cultivator support arm;
      iii. a field spring affixed between the second pivot arm and field latch; and
      iv. said field latch contacted by the second hydraulic cylinder.

18. The improvement described in claim 17, wherein first slot and second slot are horizontal to a travel surface and perpendicular to a direction of travel.

19. The adjustable cultivator hitch described in claim 18, wherein said cultivator slide frame is horizontal to a travel surface and perpendicular to a direction of travel wherein said first pivot and said second pivot move parallel to the cultivator slide frame and wherein said first pivot and said second pivot move in offset planes.

20. The improvement described in claim 19, wherein the first hitch frame further comprises a first inner frame connected to a first outer frame by a first support and wherein the second hitch frame further comprises a second inner frame connected to second outer frame by a second support, said second support pivotally attached to the first support.

21. An adjustable hitch between a first towed implement and a second towed implement, comprising:

a. a frame affixed on the first towed implement;
   b. a pair of cultivator pivot arms, each arm pivotally attached to the frame; and
   c. a pair of hitch frames, each hitch frame having a first end and a second end, said first end pivotally attached to the cultivator pivot arms and the second end pivotally attached to the second towed implement, each said hitch frame pivotally attached to each other at an intermediate point, whereby one pair of ends are positioned apart and the other pair of ends are positioned as vertically aligned.

22. The adjustable hitch described in claim 21, wherein said pair of cultivator pivot arms further comprise a first cultivator pivot arm and second cultivator pivot arm, and a pair of hydraulic cylinders that further comprises a first hydraulic cylinder and second hydraulic cylinder, and a pair of cultivator supports further comprises a first cultivator support and second cultivator support.

23. The adjustable hitch described in claim 22, further comprising a transport latch assembly comprises:

a. a first bracket attached to the first cultivator pivot arm;
   b. a first transport latch pivotally attached to the first bracket;
   c. a first transport catch affixed to the first cultivator support;
   d. a first transport spring affixed between the first pivot arm and first transport latch;
   e. said first bracket having a first bracket slot, therein, said slot for receiving said first hydraulic cylinder whereby said first cylinder contacts the first transport latch;
   f. a second bracket attached to the second cultivator pivot arm;
   g. a second transport latch pivotally attached to the second bracket;
   h. a second transport catch affixed to the second cultivator support arm;
   i. a second transport spring affixed between the second pivot arm and second transport latch; and
   j. said second bracket having a second bracket slot, therein, said second slot for receiving said second hydraulic cylinder whereby said second cylinder contacts the second transport latch.

24. The adjustable hitch described in claim 23, wherein said field latch assembly comprises:

a. a field latch pivotally attached to the second cultivator pivot arm;
   b. a field catch affixed to the first cultivator support arm;
   c. a field spring affixed between the second pivot arm and field latch; and
   d. said field latch contacted by the second hydraulic cylinder.

25. The adjustable cultivator hitch described in claim 24, wherein said pair of hitch frames further comprises a first hitch frame and a second hitch frame, said first hitch frame having a first slide, a first support, a first inner hitch and first outer hitch, said second hitch frame having a second slide, a second support, a second inner hitch and second outer hitch, said first hitch pivotally connect to the second through the first support and second support.

26. The adjustable hitch described in claim 21, wherein the first cultivator pivot arm is pivotally attached to the first hitch frame by a first pivot and the second cultivator pivot arm is pivotally connected to the second hitch frame by a second pivot, whereby the first pivot and second pivot move parallel to the cultivator slide frame.

27. The adjustable hitch described in claim 26, wherein a pair of cart slides attached to the second implement further comprises:
    a. a first hitch having a first slot, therein, said first slot for slideably receiving the first slide; and
    b. a second hitch having a second slot, therein, said second slot for slideably receiving the second slide.

28. An agricultural implement hitch made for towing a second implement behind a first implement and said hitch operable to be converted between a field configuration and a transport configuration further comprising:
    a. while said hitch is in the field configuration, the hitch is pivotal relative to the first implement in a plane generally parallel to the ground and substantially not pivotal relative to the second implement in said plane; and
    b. while said hitch is in the transport position, the hitch is pivotal relative to the second implement in the plane generally parallel to the ground and substantially not pivotal relative to the first implement in said plane.

\* \* \* \* \*